(12) United States Patent  
Wolfe

(10) Patent No.: US 6,288,492 B1
(45) Date of Patent: Sep. 11, 2001

(54) HEAD LAMP SWITCH WITH TWILIGHT SENTINEL CONTROL

(75) Inventor: George B. Wolfe, Plymouth, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/593,910

(22) Filed: Jun. 14, 2000

(51) Int. Cl.[7] .................................................. H05B 37/02
(52) U.S. Cl. ........................... 315/82; 315/157; 315/158; 315/159; 307/10.8
(58) Field of Search ............................... 315/82, 83, 149, 315/157, 158, 159; 307/10.8

(56) References Cited

U.S. PATENT DOCUMENTS

| 4,376,909 | * | 3/1983 | Tagami et al. ........................ 315/82 |
| 4,933,729 | | 6/1990 | Soejima et al. . |
| 5,214,495 | | 5/1993 | Kitanishi . |
| 5,281,895 | | 1/1994 | Suzuki et al. . |
| 5,291,038 | | 3/1994 | Hanamoto et al. . |
| 5,436,472 | | 7/1995 | Ogawa . |

* cited by examiner

Primary Examiner—David Vu
(74) Attorney, Agent, or Firm—Tarolli, Sundheim, Covell, Tummino & Szabo L.L.P.

(57) ABSTRACT

A system for controlling the turning on of vehicle headlamps 703 of a vehicle having a dome light 50 which provides a variable dome light intensity includes a sensor 40, a memory 820, a comparator 810, and a circuit 18. The sensor 40 senses the intensity of ambient light and provides a first signal $\alpha$ indicative of the intensity of the ambient light. The memory 820 stores a light value $\sigma$ corresponding to the intensity of the dome light 50. The comparator 810 receives the first signal $\alpha$ a and compares the intensity of the ambient light with the stored light value $\sigma$. The comparator 810 provides an output second signal $\beta$ when the first signal is at or below the stored light value $\sigma$. The circuit 18 turns on the vehicle headlamps 703 when the circuit 18 receives the output second signal $\beta$.

6 Claims, 7 Drawing Sheets

HEAD LAMP SWITCH WITH TWILIGHT SENTINEL CONTROL

TECHNICAL FIELD

The present invention relates to a system for controlling the headlamps of a vehicle, and more particularly, a system for adjusting the amount of ambient light which automatically actuates the headlamps of the vehicle.

BACKGROUND OF THE INVENTION

Many modern vehicles include a safety feature which automatically actuates the headlamps of the vehicle if the vehicle is being operated at twilight or nighttime and the level of intensity of ambient light becomes too low. As the level of ambient light intensity decreases with the setting of the sun, a light sensor determines the level of intensity of the ambient light and communicates that level to a system which determines if that level is below a predetermined value. If the level of ambient light intensity is below that predetermined value, the system automatically actuates the headlamps of the vehicle.

A conventional system for adjusting the predetermined value for the automatic actuation of the headlamps of the vehicle includes a slide potentiometer with an OFF detent mounted on a vehicle dashboard. The conventional system occupies considerable space on the dashboard and provides inaccurate feedback to the vehicle occupant for determining what level of ambient light will actuate the headlamps.

SUMMARY OF THE INVENTION

The present invention is a system for controlling the turning on of vehicle headlamps of a vehicle having a dome light which is adjustable to provide a variable dome light intensity. The system includes a sensor, a memory, a comparator, and a circuit. The sensor senses the intensity of ambient light and provides a first signal indicative of the intensity of the ambient light. The memory stores a light value corresponding to the intensity of the dome light. The comparator receives the first signal and compares the intensity of the ambient light with the stored light value. The comparator provides an output second signal when the first signal indicates that the ambient light is at or below the stored light value. The circuit turns on the vehicle headlamps when the circuit receives the output second signal.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DETAILED DESCRIPTION OF AN EMBODIMENT OF THE INVENTION

Figure 11:
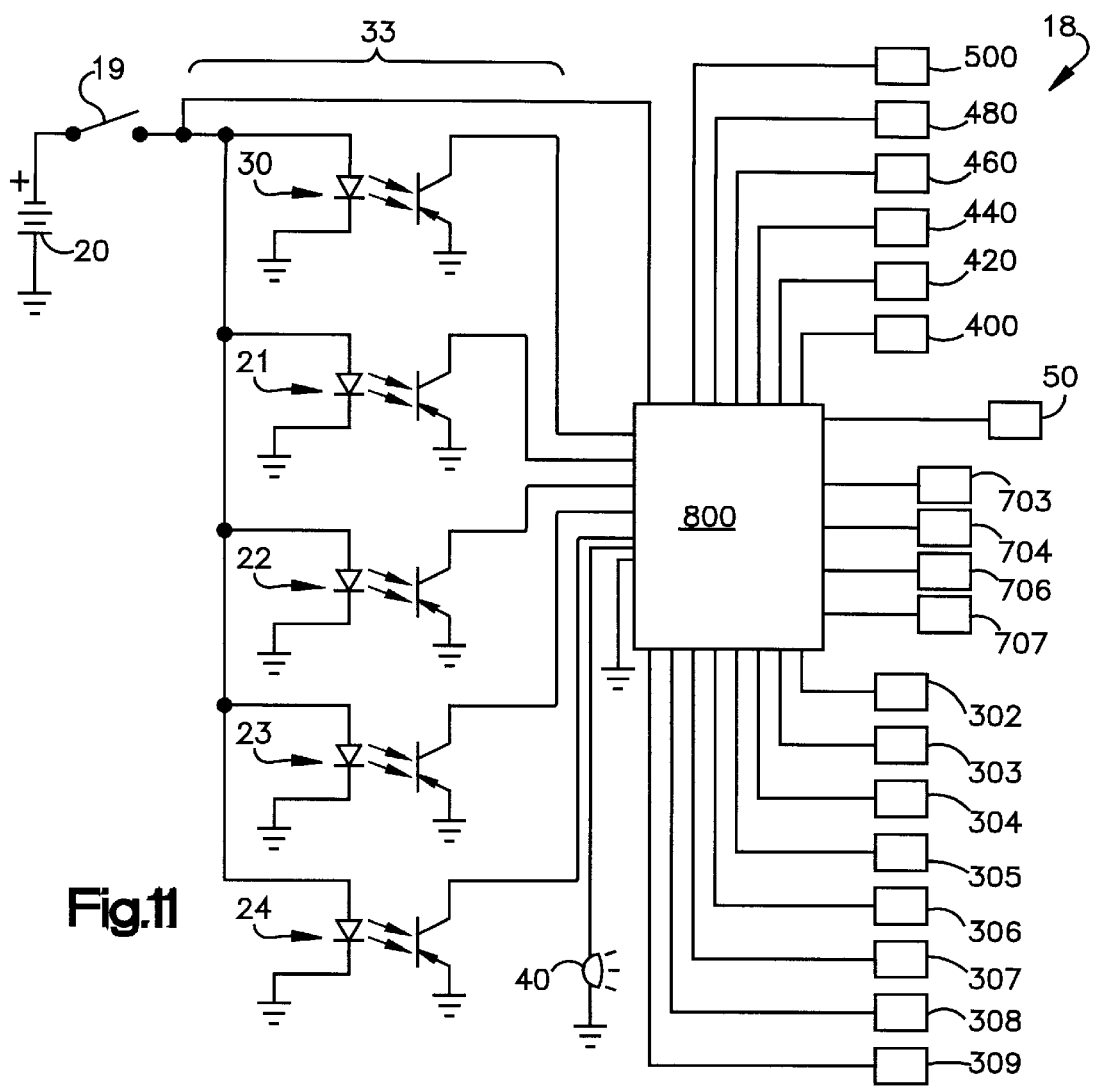
FIG. 11 is a schematic view of part of the apparatus of FIG. 1.

In accordance with the present invention, as viewed schematically in FIG. 11, a system for controlling the actuation, or turning on, of vehicle headlamps 703 and other lights of a vehicle includes an ambient light sensor 40, a controller 800, a manually operable switch 33 (FIG. 1), a circuit 18, a dome light 50 within the interior of the vehicle (not shown), output devices 703, 704, 706, 707. The sensor 40 senses the intensity of ambient light at intervals and provides a first signal a indicative of the intensity of the ambient light to the controller 800.

Figure 12:
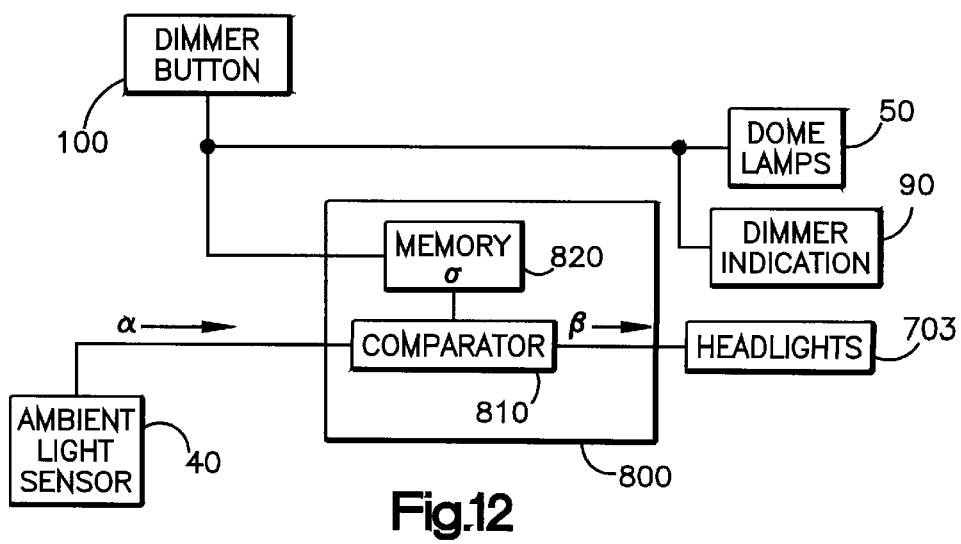
FIG. 12 is a schematic view of part of the apparatus of FIG. 11.

As viewed in FIG. 12, the controller 800 includes a memory 820 for storing a light value σ corresponding to the intensity of ambient light which will actuate the headlamps 703 and a comparator 810 for receiving the first signal a and the stored light value σ. The comparator 810 compares the intensity of the ambient light (the first signal α) with the stored light value σ. The comparator 810 provides an output second signal β to the controller 800 when the comparator 810 determines that the ambient light signal β is at or below the stored light value σ. The controller 800 turns on the vehicle headlamps 703 when the comparator generates the output second signal β.

Figure 1:
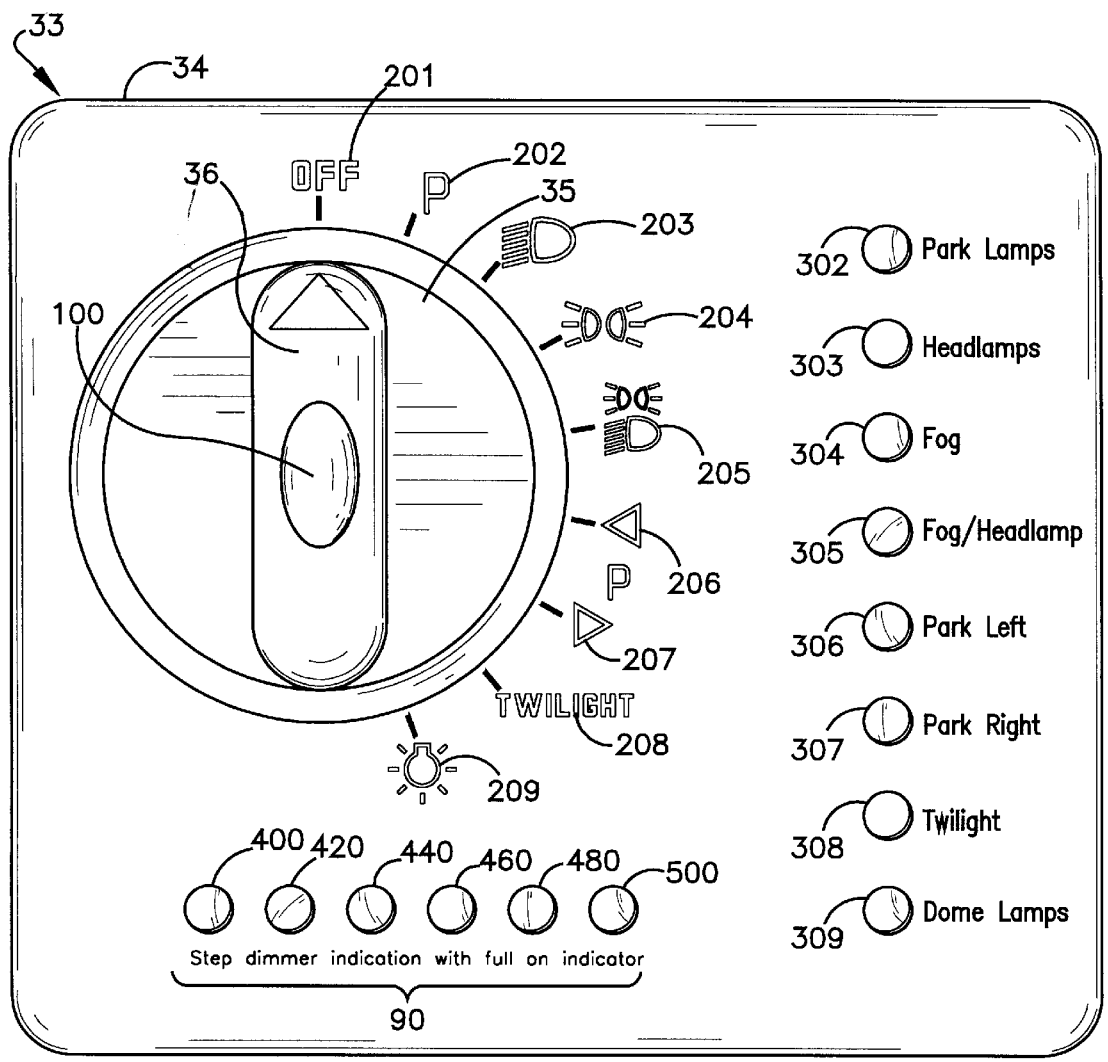
FIG. 1 is a schematic view of a control system in accordance with the present invention.

The dome light 50 is adjustable by the switch 33 to provide a variable dome light intensity corresponding to the stored light value σ. The switch 33 includes a housing 34 and a nine position cylindrical rotary knob 35 (FIG. 1). The knob 35 has a handle member 36, or gripper, for facilitating rotation of the knob 35 by a vehicle occupant. The handle member 36 has an associated oval pushbutton 100 for changing the stored light value σ and dome light intensity.

The switch 33 may be rotated to one of the following nine positions: OFF 201, Park Lamps 202, Headlamps 203, Fog 204, Fog/Headlamp 205, Park Left 206, Park Right 207, Twilight 208, and Dome Lamps 209. Every position, except the OFF position 20, has a corresponding visual indicator 302–309, such as an LED, which additionally indicates to the vehicle occupant the position of the knob 35. These visual indicators 302–309 provide the information to the vehicle occupant during nighttime operation of the vehicle.

Figures 13, 14:
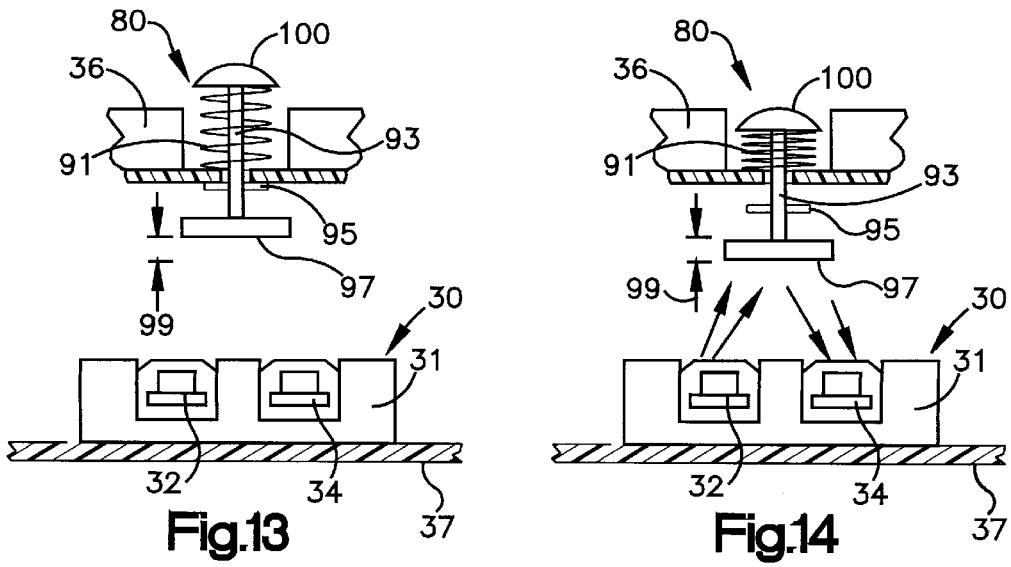
FIG. 13 is a schematic view of part of the apparatus of FIG. 1.
FIG. 14 is a schematic view of part of the apparatus of FIG. 1 in different position.

The switch 33 further includes a primary photointerruptor 30 (FIGS. 13 & 14) located directly beneath the pushbutton 100 on a circuit board 37. The pushbutton 100 is associated with a biasing mechanism 80 which maintains the pushbutton 100 in an upper position (FIG. 13). The vehicle occupant may depress the pushbutton 100 in order to move the pushbutton 100 downward to a lower position (FIG. 14). A connection member 93 is attached to the lower surface of the pushbutton 100 and projects downward to a reflective surface 97.

When the pushbutton 100 is located in the lower position (FIG. 14), the primary photointerruptor 30 is actuated because the reflecting surface 97 is within the distance range by which the primary photointerruptor 30 can be actuated, effective range 99. When the pushbutton 100 is released, the biasing mechanism 80 returns the pushbutton 100 to its upper position.

The primary photointerruptor 30 may be a reflective type photointerruptor with a resin housing 31, a light emitting chip 32, and a light receiving chip 34. The biasing mechanism 80 may include a resilient element 91 or elements such as one or more coil springs and a detent 95 for preventing the resilient element 91 from moving the pushbutton 100 beyond the upper position.

Figure 15:
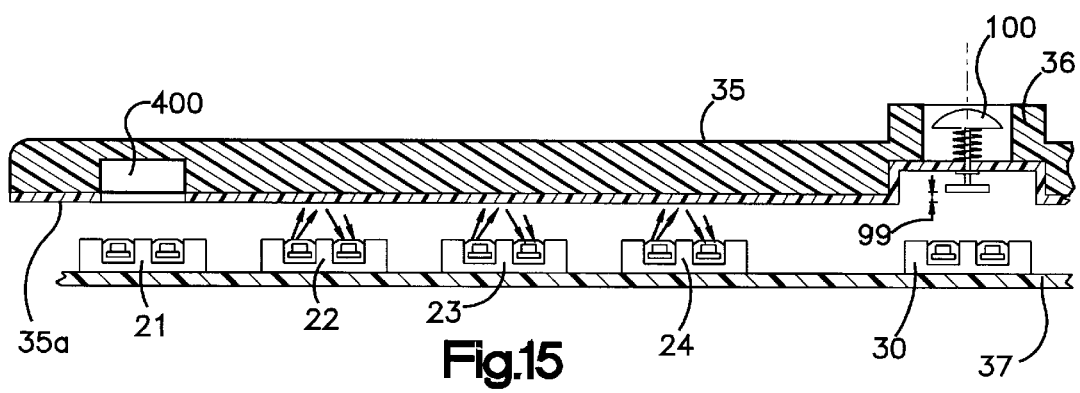
FIG. 15 is a schematic view taken along line 15—15 in FIG. 3.

As viewed in FIG. 15, the undersurface 35a of the knob 35 provides a second reflecting surface defined by the circular lower surface of the knob 35. A series of four photointerruptors 21, 22, 23, 24 are connected to the circuit board 37 below the knob 35. The first, second, third, and fourth photointerruptors 21, 22, 23, 24 are linearly mounted on a radius having a center at the axis of rotation of the knob 35, as viewed in FIGS. 2–10. The undersurface 35a of the knob 35 is located in the effective range of the four photointerruptors 21, 22, 23, 24.

The undersurface 35a of the knob 35 has a plurality of apertures 400 which can be moved to positions above the four photointerruptors 21, 22, 23, 24 as the knob 35 is rotated to each of the nine settings 201–209. When one of the apertures 400 is moved to a position above one of the four photointerruptors 21, 22, 23, 24, that photointerruptor is no longer actuated. The placement of the apertures 400 creates a four-part binary code for each of the nine positions 201–209 as the knob 35 is rotated to its nine different positions.

Figure 2:
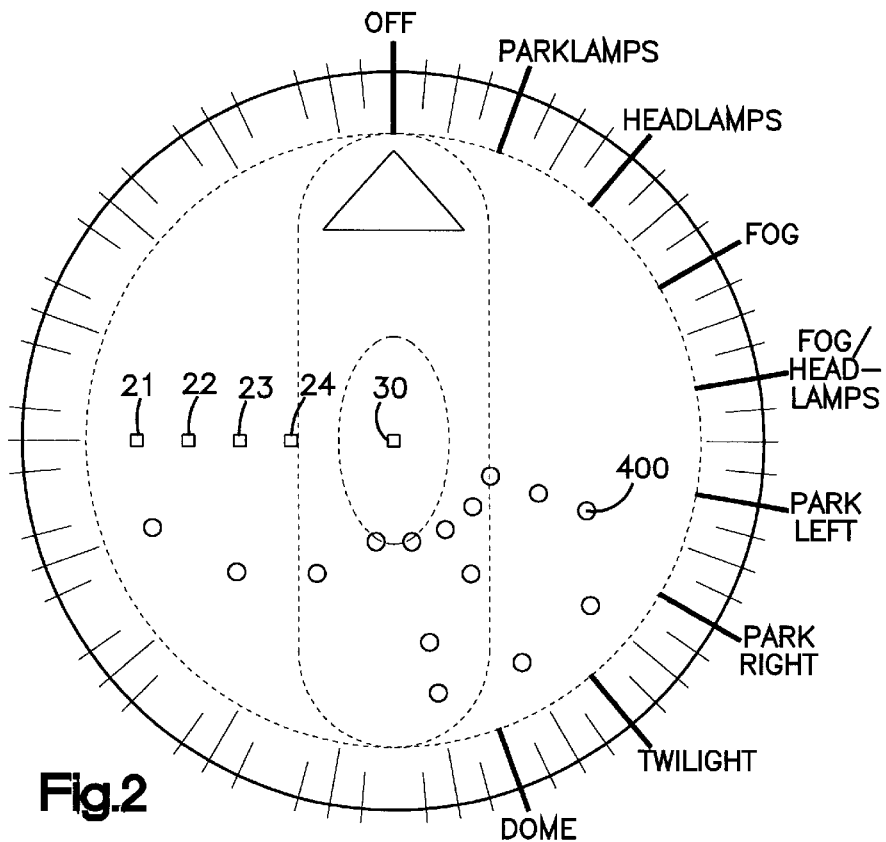
FIG. 2 is a schematic view of part of the system of FIG. 1 in a first position.

As viewed in FIG. 2, when the knob 35 is rotated to the OFF position 201, no apertures 400 are positioned above the four photointerruptors 21, 22, 23, 24. This defines a code of (0,0,0,0,) with 0 representing each of the four photointerruptors 21, 22, 23, 24 in an actuated, or non-interrupted, state.

Figure 3:
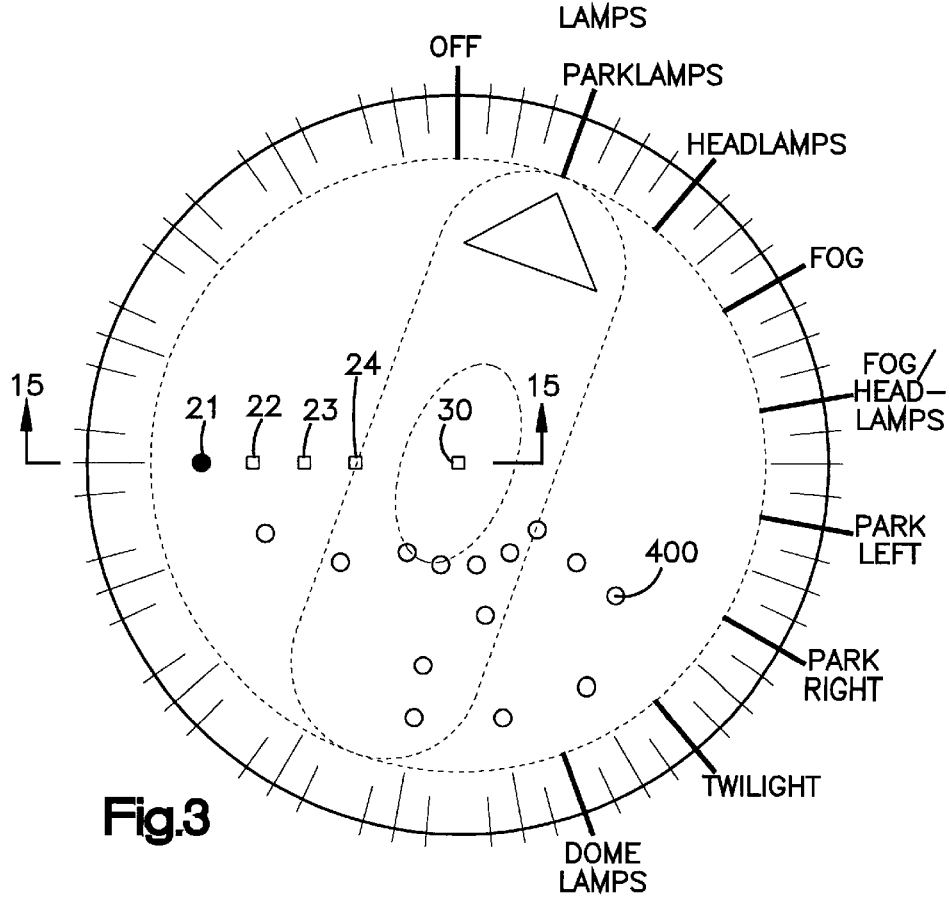
FIG. 3 is a schematic view of the part of the system in FIG. 1 in a second position.

As viewed in FIG. 3, when the knob 35 is rotated to the PARK LAMPS 202 position, an aperture 400 is positioned above the first photointerruptor 21. This defines a code of (1,0,0,0) with 1 representing the first photointerruptor 21 in an interrupted state, and the second, third, and fourth photointerruptors 22, 23, 24 in a non-interrupted state.

Figure 4:
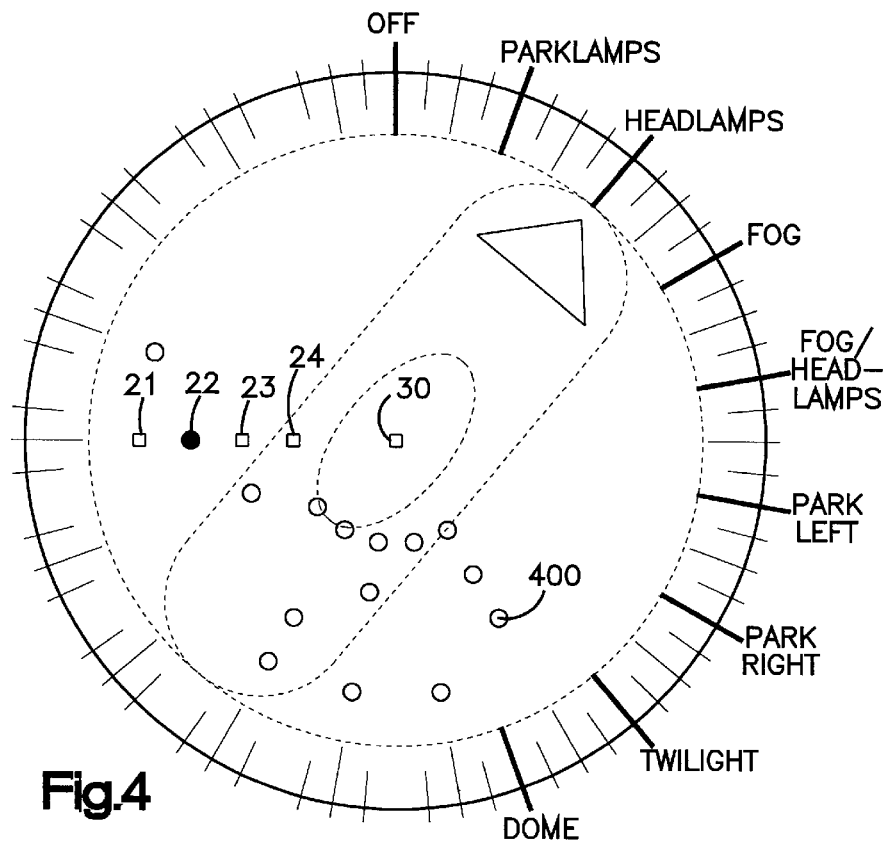
FIG. 4 is a schematic view of the part of the system in FIG. 1 in a third position.

As viewed in FIG. 4, when the knob 35 is rotated to the HEADLAMPS 203 position, an aperture 400 is positioned above the with second photointerruptor 22. This defines a code of (0,1,0,0) with the second photointerruptor 22 in an interrupted state, and the first, third, and fourth photointerruptors 21, 23, 24 in a non-interrupted state.

Figure 5:
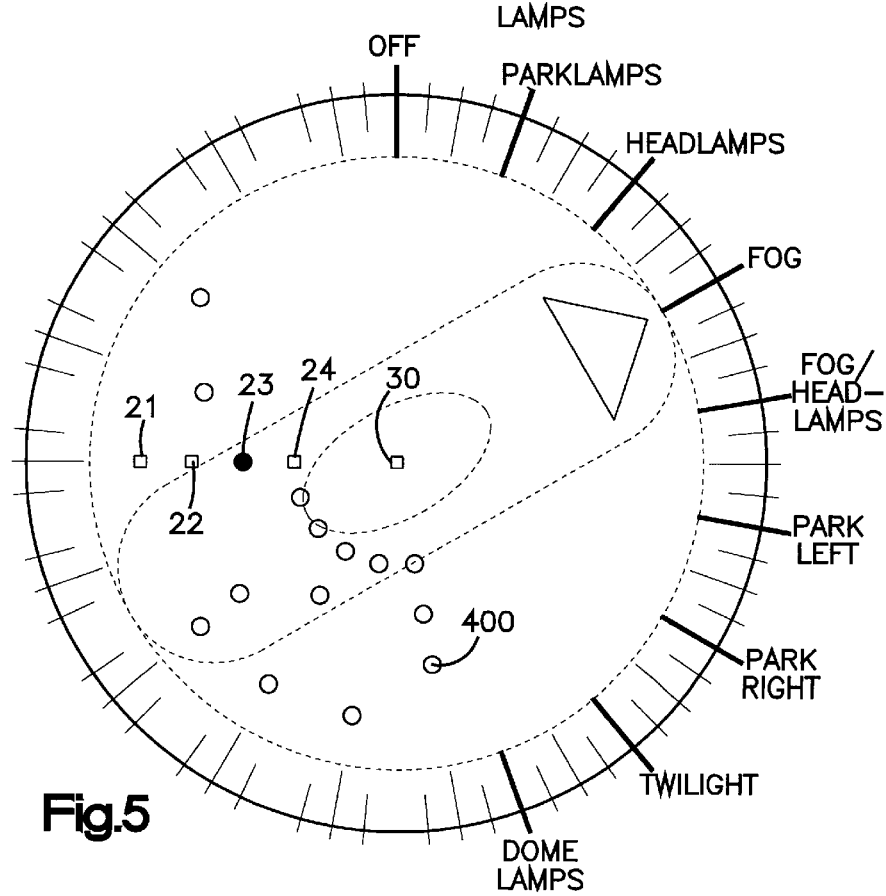
FIG. 5 is a schematic view of the part of the system in FIG. 1 in a fourth position.

As viewed in FIG. 5, when the knob 35 is rotated to the FOG lamps position 204, an aperture 400 is positioned above the third photointerruptor 23. This defines a code of (0,0,1,0) with the third photointerruptor 23 in an interrupted state, and the first, second, and fourth photointerruptors 21, 22, 24 in a non-interrupted state.

Figure 6:
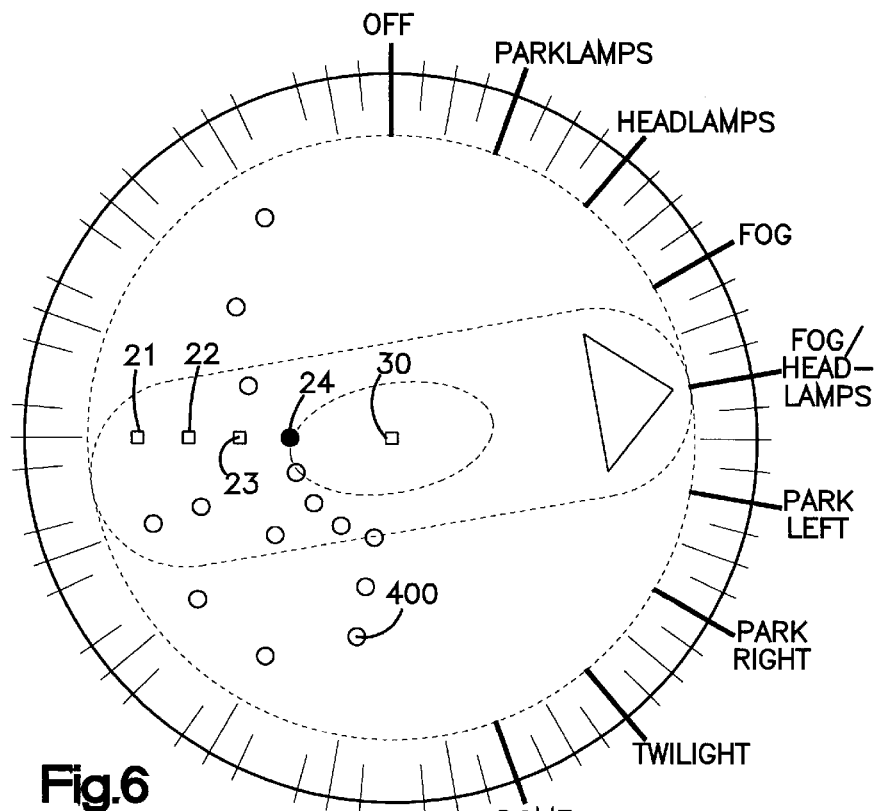
FIG. 6 is a schematic view of the part of the system in FIG. 1 in a fifth position.

As viewed in FIG. 6, when the knob 35 is rotated to the combination FOG/HEADLAMPS position 205, an aperture 400 is positioned above the fourth photointerruptor 24. This defines a code of (0,0,0,1) with the fourth photointerruptor 24 in an interrupted state, and the first, second, and third photointerruptors 21, 22, 23 in a non-interrupted state.

Figure 7:
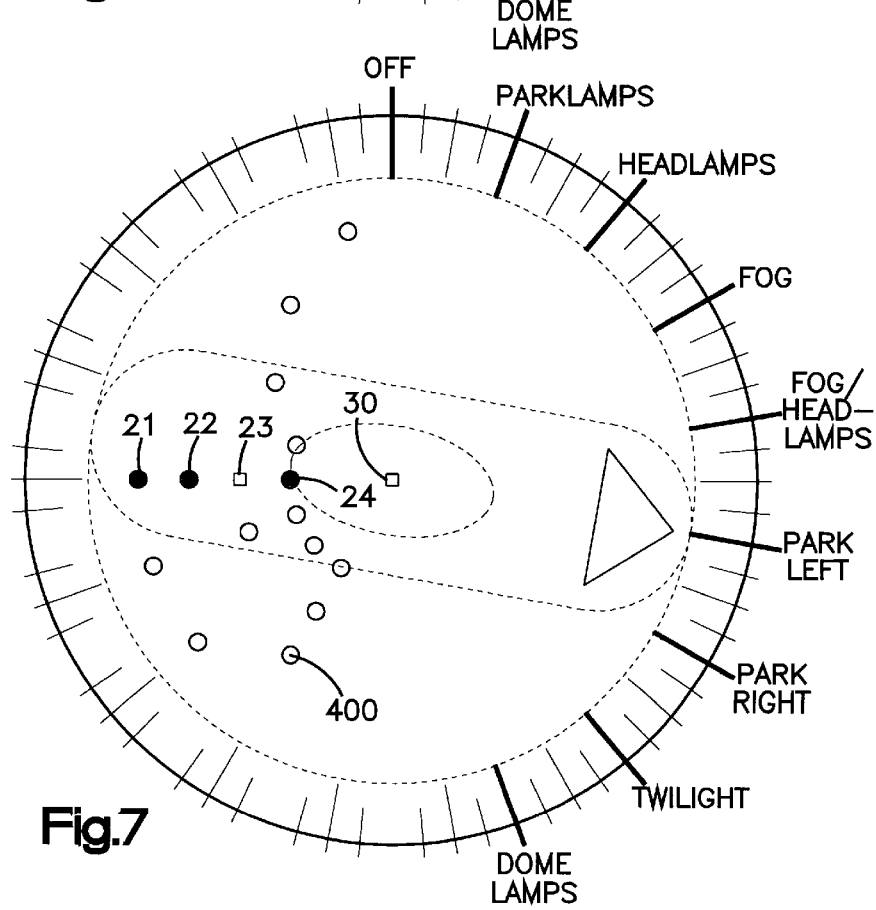
FIG. 7 is a schematic view of the part of the system in FIG. 1 in a sixth position.

As viewed in FIG. 7, when the knob 35 is rotated to the PARK LEFT position 206, apertures 400 are positioned above the first, second, and fourth photointerruptors 21, 22, 24. This defines a code of (1,1,0,1) with the first, second, and fourth photointerruptors 21, 22, 24 in an interrupted state, and the third photointerruptor 23 in a non-interrupted state.

Figure 8:
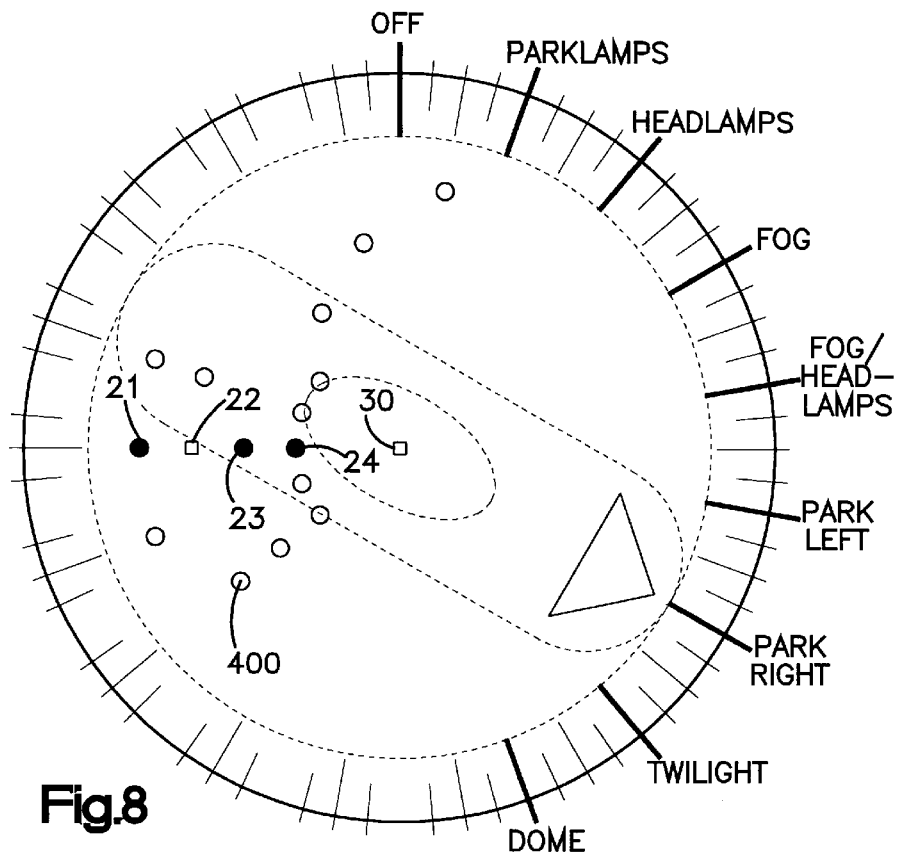
FIG. 8 is a schematic view of the part of the system in FIG. 1 in a seventh position.

As viewed in FIG. 8, when the knob 35 is rotated to the PARK RIGHT position 207, apertures 400 are positioned above the first, third, and fourth photointerruptors 21, 23, 24. This defines a code of (1,0,1,1) with the first, third, and fourth photointerruptors 21, 23, 24 in an interrupted state, and the second photointerruptor 22 in a non-interrupted state.

Figure 9:
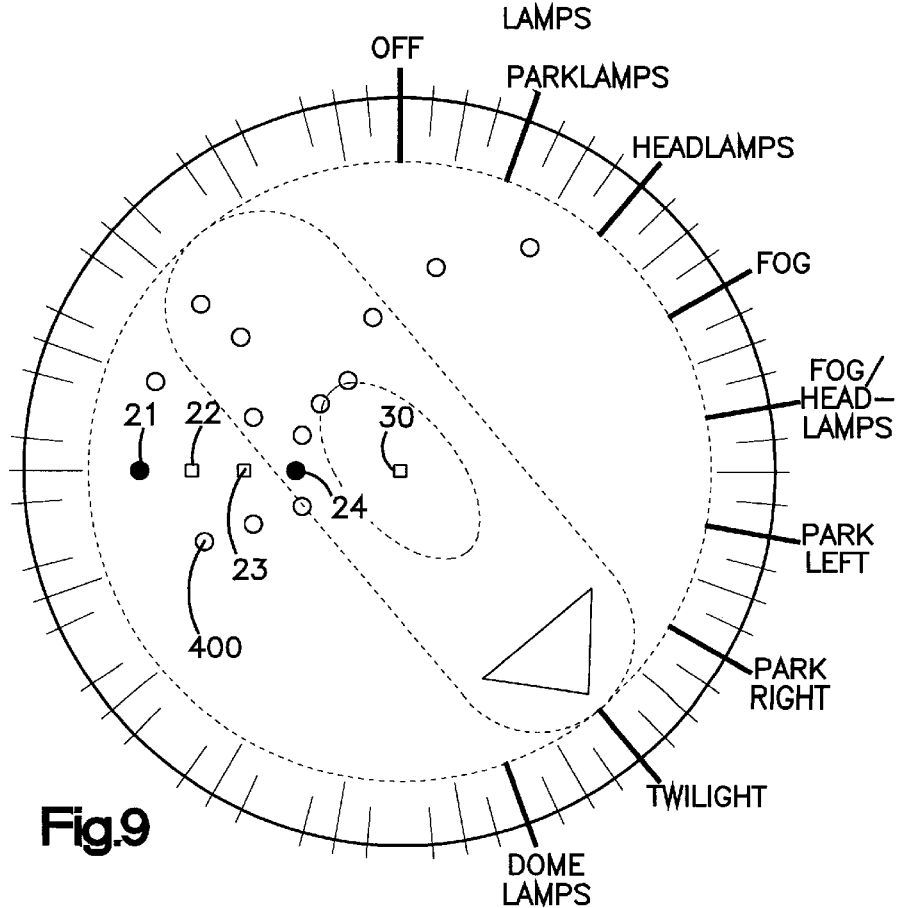
FIG. 9 is a schematic view of the part of the system in FIG. 1 in an eighth position.

As viewed in FIG. 9, when the knob 35 is rotated to the TWILIGHT position 208, apertures 400 are positioned above the first and fourth photointerruptors. This defines a code of (1,0,0,1) with the first and fourth photointerruptors 21, 24 in an interrupted state, and the second and third photointerruptors 22, 23 in a non-interrupted state.

Figure 10:
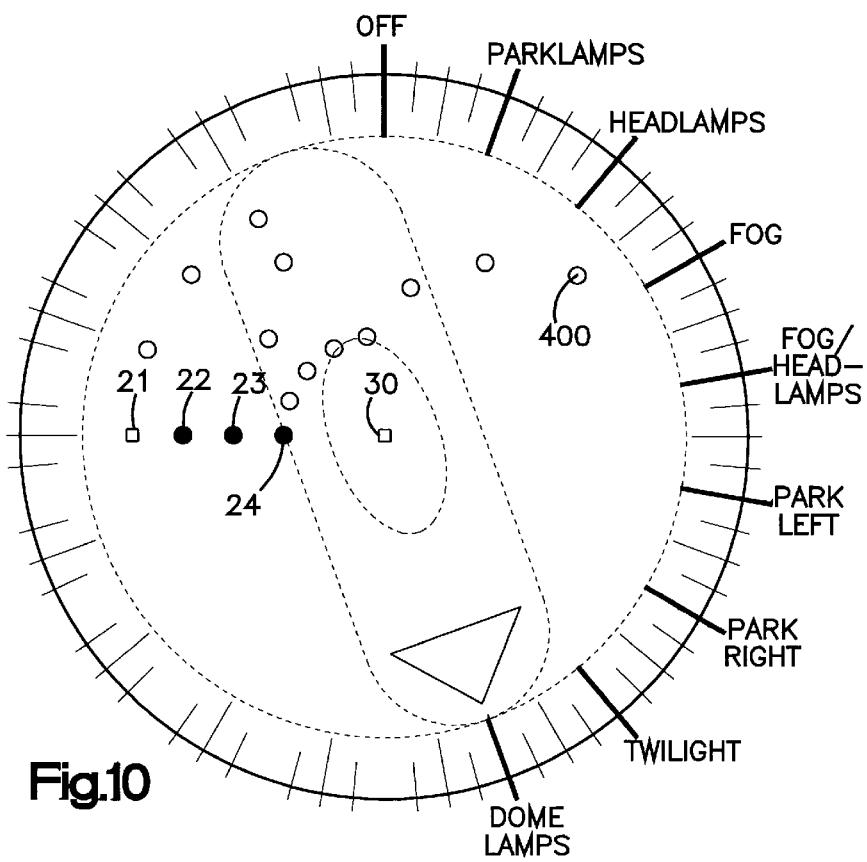
FIG. 10 is a schematic view of the part of the system in FIG. 1 in a ninth position.

As viewed in FIG. 10, when the knob 35 is rotated to the DOME LAMPS position 209, apertures 400 are positioned above the second, third, and fourth photointerruptors 23, 23, 24. This defines a code of (0,1,1,1) with the second, third, and fourth photointerruptors 22, 23, 24 in an interrupted state, and the first photointerruptor 21 in a non-interrupted state.

FIG. 11 illustrates a circuit 18 which can operate the above described embodiment of the present invention. The circuit is preferably mounted on the circuit board 37. The primary photointerruptor 30 and the first, second, third, and fourth photointerruptors 21, 22, 23, 24 provide binary signals to the controller 800. A power source 20, such as a car battery, provides power to the entire circuit 18 while the vehicle engine is running and the ignition switch 19 is closed.

At any of the nine positions 201–209 of the knob 35, the four photointerruptors 21, 22, 23, 24 provide a four part binary code to the controller 800, as described above, which determines the power output of the controller 800 to the various light output devices. These light output devices may be the dome light 50, the headlamps 703, the fog lights 704, the left parking lamps 706, and the right parking lights 707. Also, the light sensor 40 provides the first ambient light signal β to the controller 800, as described above.

When the circuit 18 is powered, the controller 800 sends a signal to visual twilight indicators 90, such as LED's, on the switch 33. The twilight indicators 90 correspond to the stored ambient light value σ at which the controller 800 will automatically actuate the headlamps 703. This stored ambient light value σ has been determined by a previous setting or adjustment of the switch 33 and is the stored light value σ defined above.

The stored light value σ may be adjusted only when the knob 35 is rotated to the TWILIGHT position 208 on the switch 33 (FIG. 9). The TWILIGHT position 208 defines a code of (1,0,0,1). The code causes the controller 800 to send power to a visual indicator 308 on the switch 33. This indicator 308 indicates to the vehicle occupant that the stored light value σ may be adjusted utilizing the pushbutton 100 on the handle member 36 of the knob 35.

The twilight indicators 90 indicate ambient light values as a percentage of a predetermined maximum light intensity. This percentage determines the amount of ambient light at or below which the headlamps 703 will automatically actuate. When the vehicle occupant depresses the pushbutton 100, the reflecting surface 97 actuates the primary photointerruptor 30 thereby sending an uninterrupted signal (0) to the controller 800 causing the stored light value σ to move one incremental step.

In the TWILIGHT position 208, the first LED 400 may indicate a percentage 0, which will cause the headlamps 703 to never automatically actuate. When the first LED 400 is emitting light, the controller 800 sends no power to the dome light 50. The fact that the dome light 50 is not lit at the TWILIGHT position on the switch 33 indicates to the vehicle occupant that the headlamps 703 will not automatically actuate even when there is complete darkness outside the vehicle.

In the TWILIGHT position 208, the second LED 420 may indicate a percentage of 20, which will cause the headlamps 703 to automatically actuate when the ambient light is less than 20% of the predetermined maximum light intensity. When the second LED 420 is emitting light, the controller 800 sends a relatively small amount of power to the dome light 50 to cause the dome light 50 to be dimly lit. The fact that the dome light 50 is dimly lit indicates to the vehicle occupant that the headlamps 703 will automatically actuate when there is "almost" complete darkness outside the vehicle.

In the TWILIGHT position 208, the third LED 440 may indicate a percentage of 40, which will cause the headlamps 703 to automatically actuate when the ambient light is less than 40% of the predetermined maximum light intensity. When the third LED 440 is emitting light, the controller 800 sends a relatively mid-range amount of power to the dome light 50 to cause the dome light 50 to be brighter than the previous step, but still fairly dim. The fact that the dome light 50 is fairly dimly lit indicates to the vehicle occupant that the headlamps 703 will automatically actuate when there is a "little less than the middle of twilight" amount of light outside the vehicle.

In the TWILIGHT position 208, the fourth LED 460 may indicate a percentage of 60, which will cause the headlamps 703 to automatically actuate when the ambient light is less than 60% of the predetermined maximum light intensity. When the fourth LED 460 is emitting light, the controller 800 sends a higher relatively mid-range amount of power to the dome light 50 to cause the dome light 50 to be brighter than the previous step, but not very bright. The fact that the dome light 50 is not very brightly lit indicates to the vehicle occupant that the headlamps 703 will automatically actuate when there is a "little more than the middle of twilight" amount of light outside the vehicle.

In the TWILIGHT position 208, the fifth LED 480 may indicate a percentage of 80, which will cause the headlamps 703 to automatically actuate when the ambient light is less than 80% of the predetermined maximum light intensity. When the fifth LED 480 is emitting light, the controller 800 sends a large amount of power to the dome light 50 to cause the dome light 50 to be brighter than the previous step, but not fully lit. The fact that the dome light 50 is almost fully lit indicates to the vehicle occupant that the headlamps 703 will automatically actuate when there is an "almost daylight" amount of light outside the vehicle.

In the TWILIGHT position, the sixth LED 500 may indicate a percentage of 100, which will cause the headlamps 703 to automatically actuate even when the ambient light is 100% of the predetermined maximum light intensity, or always. When the sixth LED 500 is emitting light, the controller 800 sends a maximum amount of power to the dome light 50 to cause the dome light 50 to be brighter than the previous step and fully lit. The fact that the dome light 50 is fully lit indicates to the vehicle occupant that the headlamps 703 will automatically actuate even when it is daylight outside the vehicle.

When the knob 35 is rotated to the OFF position 201 (FIG. 2), the four photointerruptors 21, 22, 23, 24 provide the code (0,0,0,0) to the controller 800. This code causes the controller 800 to send no power to the light devices except to one of the six LED's of the twilight indicators 90 indicating to the vehicle occupant the stored light value σ for automatic headlamp 703 actuation.

When the knob 35 is rotated to the PARK LAMPS position 202 (FIG. 3), the four photointerruptors 21, 22, 23, 24 provide the code (1,0,0,0) to the controller 800. This code causes the controller 800 to send power to the left parking lamps 706, the right parking lamps 707, a Park Lamp visual indicator 303 on the switch 33, and one of the six LED's of the twilight indicators 90 indicating to the vehicle occupant the stored light value σ for automatic headlamp 703 actuation.

When the knob 35 is rotated to the HEADLAMPS position 203 (FIG. 4), the four photointerruptors 21, 22, 23, 24 provide the code (0,1,0,0) to the controller 800. This code causes the controller 800 to send power to the headlamps 703, the left parking lamps 706, the right parking lamps 707, a Headlamp visual indicator 303 on the switch 33, and one of the six LED's of the twilight indicators 90 indicating to the vehicle occupant the stored light value σ for automatic headlamp 703 actuation.

When the knob 35 is rotated to the FOG position 204 (FIG. 5), the four photointerruptors 21, 22, 23, 24 provide the code (0,0,1,0) to the controller 800. This code causes the controller 800 to send power to the foglamps 704, the left parking lamps 706, the right parking lamps 707, a Fog visual indicator 304 on the switch 33, and one of the six LED's of the twilight indicators 90 indicating to the vehicle occupant the stored light value σ for automatic headlamp 703 actuation.

When the knob 35 is rotated to the FOG/HEADLAMPS position 205 (FIG. 6), the four photointerruptors 21, 22, 23, 24 provide the code (0,0,0,1) to the controller 800. This code causes the controller 800 to send power to the headlamps 703, the fog lamps 704, the left parking lamps 706, the right parking lamps 707, a Fog/Headlamp visual indicator 305 on the switch 33, and one of the six LED's of the twilight indicators 90 indicating to the vehicle occupant the stored light value σ for automatic headlamp 703 actuation.

When the knob 35 is rotated to the PARK LEFT position 206 (FIG. 7), the four photointerruptors 21, 22, 23, 24 provide the code (1,1,0,1) to the controller 800. This code causes the controller 800 to send power to the left parking lamps 706, the Park Left visual indicator 306 on the switch 33, and one of the six LED's of the twilight indicators 90 indicating to the vehicle occupant the stored light value σ for automatic headlamp 703 actuation.

When the knob 35 is rotated to the PARK RIGHT position 207 (FIG. 8), the four photointerruptors 21, 22, 23, 24 provide the code (1,0,1,1) to the controller 800. This code causes the controller 800 to send power to the right parking lamps 707, the Park Right visual indicator 307 on the switch 33, and one of the six LED's of the twilight indicators 90 indicating to the vehicle occupant the stored light value σ for automatic headlamp 703 actuation.

When the knob 35 is rotated to the DOME LAMPS position 209 (FIG. 10), the four photointerruptors 21, 22, 23, 24 provide the code (0,1,1,1) to the controller 800. This code causes the controller 800 to send full power to the dome lamp 50, a Dome Lamp visual indicator on the switch 33, and one of the six LED's of the twilight indicators 90 indicating to the vehicle occupant the stored light value σ for automatic headlamp 703 actuation.

From the above description of the invention, those skilled in the art will perceive improvements, changes, and modifications. Such improvements, changes, and modifications within the skill in the art are intended to be included within the scope of the appended claims.

What is claimed is:

1. A system for controlling the turning on of vehicle headlamps of a vehicle having a dome light which provides a variable dome light intensity, said system comprising:

a sensor for sensing the intensity of ambient light and providing a first signal indicative of the intensity of the ambient light;

a memory for storing a light value corresponding to the intensity of the dome light;

a comparator for receiving said first signal and for comparing the intensity of the ambient light with said stored light value, said comparator providing an output second signal when said first signal is at or below said stored light value; and a circuit for turning on the vehicle headlamps when said circuit receives said output second signal.

2. The system as defined in claim 1 further including a switch having a rotary knob with a first position for turning on the vehicle headlamps, a second position for turning on the dome light, and a third position at which the intensity of the dome light may be adjusted.

3. The system as defined in claim 2 further including a series of photointerruptors, said rotary knob in said first, second, and third positions causing interruption of different combinations of light beams and a controller responsive to the different combinations to actuate said headlamps and said dome light.

4. The system as defined in claim 3 further including a primary photointerruptor for adjusting said stored light value.

5. The system as defined in claim 4 wherein said rotary knob has an undersurface for reflecting light emitted by four of said series of photointerruptors.

6. The system as defined in claim 5 wherein said undersurface includes apertures for interrupting the reflecting of light from at least one of said series of photointerruptors and providing a code input for said controller.

\* \* \* \* \*